US008803467B2

(12) United States Patent
Sun

(10) Patent No.: US 8,803,467 B2
(45) Date of Patent: Aug. 12, 2014

(54) PARTIAL ARC CURVILINEAR DIRECT DRIVE SERVOMOTOR

(75) Inventor: Xiuhong Sun, Windham, NH (US)

(73) Assignee: The Keyw Corporation, Hanover, MD (US)

( * ) Notice: Subject to any disclaimer, the term of this patent is extended or adjusted under 35 U.S.C. 154(b) by 313 days.

(21) Appl. No.: 13/273,373

(22) Filed: Oct. 14, 2011

(65) Prior Publication Data

US 2012/0206081 A1    Aug. 16, 2012

Related U.S. Application Data

(60) Provisional application No. 61/443,518, filed on Feb. 16, 2011.

(51) Int. Cl.
*G05B 11/01* (2006.01)
*G08C 19/20* (2006.01)

(52) U.S. Cl.
CPC .......................................... *G08C 19/20* (2013.01)
USPC ............ 318/686; 318/687; 318/671; 318/560

(58) Field of Classification Search
CPC ........................................................ G08C 19/20
USPC .................................. 318/686, 687, 560, 671
See application file for complete search history.

(56) References Cited

U.S. PATENT DOCUMENTS

| 4,839,544 | A |   | 6/1989 | Sakai |
| 4,843,292 | A | * | 6/1989 | Ono et al. ...................... 318/606 |
| 5,010,262 | A |   | 4/1991 | Nakagawa et al. |
| 5,038,090 | A | * | 8/1991 | Kawabata et al. ............ 318/721 |
| 5,072,144 | A |   | 12/1991 | Saito et al. |
| 5,130,583 | A |   | 7/1992 | Andoh |
| 5,214,323 | A |   | 5/1993 | Ueda et al. |
| 5,229,669 | A |   | 7/1993 | Takei |
| 5,606,256 | A |   | 2/1997 | Takei |
| 6,442,851 | B1 |   | 9/2002 | Botos et al. |
| 7,002,315 | B2 | * | 2/2006 | Aono et al. .................... 318/625 |
| 8,384,251 | B2 | * | 2/2013 | Shikayama et al. ....... 310/12.15 |
| 2004/0252881 | A1 |   | 12/2004 | Levin et al. |

* cited by examiner

*Primary Examiner* — David Luo
(74) *Attorney, Agent, or Firm* — Morrison & Foerster LLP

(57) ABSTRACT

A partial arc servomotor assembly having a curvilinear U-channel with two parallel rare earth permanent magnet plates facing each other and a pivoted ironless three phase coil armature winding moves between the plates. An encoder read head is fixed to a mounting plate above the coil armature winding and a curvilinear encoder scale is curved to be co-axis with the curvilinear U-channel permanent magnet track formed by the permanent magnet plates. Driven by a set of miniaturized power electronics devices closely looped with a positioning feedback encoder, the angular position and velocity of the pivoted payload is programmable and precisely controlled.

3 Claims, 6 Drawing Sheets

PARTIAL ARC CURVILINEAR DIRECT DRIVE SERVOMOTOR

FEDERALLY SPONSORED RESEARCH

This invention was made with government support under SBIR Phase I and Phase II contract numbers NNX07CA60P and NNX08CA27C awarded by NASA. The government has certain rights in the invention.

CROSS-REFERENCE TO RELATED APPLICATION

This application claims the benefit of Provisional Application No. 61/443,518, filed Feb. 16, 2011, which is incorporated herein by reference.

BACKGROUND OF THE INVENTION

1. Field of the Invention

This invention relates generally to a direct drive servomotor and, more particularly, to a partial arc curvilinear direct drive servomotor (PACDDS) system, featuring a customized partial arc curvilinear magnetic way assembly and a low inertial guided sliding coil assembly that is directly driven to slide along the curved magnetic way by electric power.

PACDDS is a structurally simple and compact yet finely controlled by a set of advanced closed-loop power electronics that consists of an encoder and a servomotor drive. It features great power efficiency and high loading capacity to drive a payload to implement a high dynamic angular motion and precision angular positioning. PACDDS is a key component to implement low size, weight, and power consumption (SWaP) airborne gimbals with fast and precision performance for advanced imaging system stabilization, pointing, tracking, scanning, and seeking. It can also be used for many other customized motion-controlled devices such as robotic arms.

2. Description of Related Art

Airborne multi-axis gimbals for a high-end mapping camera are generally not available as COTS especially if low SWaP and optimized performance for flexible motion profiles are needed. PACDDS was invented as a key component to implement a structurally simple, low SWaP multi-functional high performance airborne roll, pitch, yaw 3-axis gimbals that precisely drive a massive 18 lb balanced payload. Such a payload includes a large format digital camera and a big telephoto lens for advance photogrammetric application.

A prior art angular motion driving device for a gimbal generally consists of a circular or linear motor coupled with a set of mechanical transmission devices, such as a set of worm gear drive. Gimbals that use mechanical transmission devices are generally associated with a low efficiency and poor responsiveness caused by additional motion inertia and friction of the transmission. They are also poor in accuracy caused by transmission-induced mechanical hysteresis and backlash. PACDDS directly converts the supplied electric power into a desired curvilinear motion of an ironless light weight coil based mover sliding along a customized arc length at an optimized radius of a U-channel magnetic way without using any mechanical transmission components. Hence it is structurally simplified and eliminates completely the mechanical hysteresis and backlash position errors in our Gimbal design to ensure highly accurate and repeatable angular positioning. By adopting a high efficient power-electronics based motor driver with a precision optical encoder for closed loop motion control, PACDDS is very power efficient, acoustically quiet, and powerful to drive a massive payload for angular motion and stabilization.

U.S. Pat. No. 5,684,344 issued Nov. 4, 1997 to Seiji Takei discloses a drive unit which supports object to be moved and a driving device in the form of a linear electromagnetic actuator which drives the curved guide unit. A moving magnetic type of linear direct current motor is employed for the electromagnetic actuator. However, the device is neither designed with a light weight ironless forcer nor U-channel magnetic way of the present invention. It also does not disclose an advanced digital servo type for very precision closed loop motion control. Along with its magnetic field leakage and heavier moving mass design, it is not as responsive, powerful, precise and efficient as those of the present invention, the PACDDS. The PACDDS ironless motor has several advantages over iron core motors such as lower moving coil mass, lower inductance, lower losses, higher stiffness and higher peak force capacity resulting in higher bandwidth, higher acceleration, better velocity control, and reduced position settling time.

U.S. Pat. No. 6,442,851 issued Sep. 3, 2002 to Stephen J. Botos et al. discloses a low profile tilt stage used for precision motor control such as positioning optical fibers for fiber to fiber bonding comprising a planar base 10, a cradle 17 defining a cylindrical surface having a cylindrical axis parallel to the base 10, a tilt table 11 mounted on the cradle by curvilinear bearings 28, 29 for rotation around the cylindrical axis of the cradle 17 and the table 11, the motor comprising an armature winding 15 nestled in the cradle 17, a rare earth permanent magnet track mounted on the underside of the table 11, an encoder reader 30 fixed relative to the base, and an encoder scale fixed to the tilt table 11. However, only a single layer of magnet track is used that is mosaicked by several curved surface thin magnets, whereas the present invention comprises a U-channel magnetic way with two parallel flat magnet tracks facing each other with a forcer or armature winding sliding between and along the curved U-channel of two flat plates, where a much more uniform and stronger magnetic field works.

SUMMARY OF THE INVENTION

Accordingly, it is therefore an object of this invention to provide a partial arc direct drive servomotor comprising a curvilinear U-channel rare earth permanent magnet track and an ironless three-phase coil armature winding.

It is another object of this invention to provide a partial arc curvilinear direct drive servomotor comprising a U-channel magnetic track having two parallel magnet plates facing each other with the armature winding movable along the U-channel of the magnetic track.

It is another object of this invention to provide a partial arc curvilinear direct drive servomotor comprising a radius and arc length scalable U-channel magnetic track having a pair of parallel magnet plates facing each other, each of which is mosaicked by plural standardized rare earth magnet tiles. The radius and arc length of the curved magnetic track can be customized for optimized application needs. An armature winding slides along the arc path of curved U-channel of the magnetic track at the customized radius and angle ranges.

It is a further object of this invention to provide a partial arc curvilinear direct drive motor assembly comprising an encoder system having an encoder read head fixed on the armature winding and an encoder scale fixed on a mounting fixture of the stationary permanent magnet track.

It is yet another object of this invention to provide a commercial off the shelf (COTS) miniature digital servomotor driver operating on DC power, referred to as the Elmo Whistle, to drive the forcer of the curvilinear partial arc servomotor assembly and support up to 10 Amps continuous current to the forcer (the coil armature winding) to provide controlled angular positioning and movement for the payload.

It is another object of this invention to provide an electric signal circuit that connects the read head of the encoder and the miniature digital servo driver, which establishes a closed positioning loop to perform positioning feedback motion control and hence implement the positioning feedback servo function.

It is a further object of this invention to provide a bearing assembly that provides pivoted guidance for the angular motion of the coil armature winding forcer as well as the forcer attached to a payload.

It is another object of this invention to provide a set of modularized curvilinear U-Channel magnetic ways, which are designed with a series of specific radiuses and various incremental arc lengths, to implement nested multi-axis gimbal drivers.

It is another object of this invention to provide fine-tuned PACDDS configurations into the firmware of Elmo Whistle drivers, which are specially tuned or specially generated for special PACDDSs and their related payload characteristics. The payloads generally differ in mass and mass distribution, rigidness and resonant frequency, and need to be driven with mission defined motion profiles.

These and other objects are further accomplished by a curvilinear partial arc direct drive servomotor assembly comprising a pair of parallel plates having a partial arc separated by a steel spacer, a first plurality of permanent magnets attached to a first of the parallel plates on an inside surface, the permanent magnets being arranged adjacent to each other in an alternating north-south pole pattern forming a first plate of the magnetic track, a second plurality of permanent magnets attached to a second of the parallel plates on an inside surface, the permanent magnets being arranged adjacent to each other in an alternating south-north pole pattern symmetrically across from the north-south pole pattern of the first of the parallel plates forming a second plate of a magnetic track, a moveable armature winding positioned between the first and second magnetic track plates, and an encoder system having a read head mounted to the armature winding and above a curvilinear encoder scale mounted on top of the first magnetic plate. The spacer is made of low carbon steel. The first plurality of permanent magnets and the second plurality of permanent magnets comprise rare earth magnets. The armature winding comprises three-phase ironless core coils having a Y-connection. The permanent magnets are arranged on the first and second magnetic plates to have a standardized magnetic pitch, such as 24 degrees, between a center of a north pole magnet and a center of a next north pole magnet in an alternating north and south magnet arrangement. The permanent magnets are arranged on the first and second magnetic plates to have one magnetic pitch from a standardized pitch series of 24, 18, 12, and 6 degrees between a center of a north pole magnet to a next north pole magnet for an alternating north and south magnet arrangement. The permanent magnets or magnetic tiles attached to the first magnetic plate and the second magnetic plate comprise standardized one inch square rare earth magnets for forming a series of scalable partial arc U-channel magnetic track assemblies including an arced magnetic track assembly with a magnet assembly radius of approximately 146.6 mm along which the magnet tiles are periodically mounted with a twenty-four degree pitch or an arced U-channel magnetic track assembly with a magnet assembly radius of approximately 1.94.84 mm along which the magnet tiles are mounted with an eighteen degree pitch.

The objects are further accomplished by a combination of a partial arc curvilinear direct drive servomotor (PACDDS) assembly, a digital controller coupled to the PACDDS assembly to provide a drive signal to the PACDDS assembly in response to a motion command and a positioning feedback signal, and a position sensor optical encoder attached to the PACDDS assembly for monitoring reference position of a coil armature or forcer of the PACDDS assembly to the fixed encoder scale and providing the positioning feedback signal to the digital controller to enable closed-loop servomotor operation of the PACDDS assembly. The PACDDS assembly comprises the forcer having a three-phase coil armature for receiving the driver signal from the digital controller.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
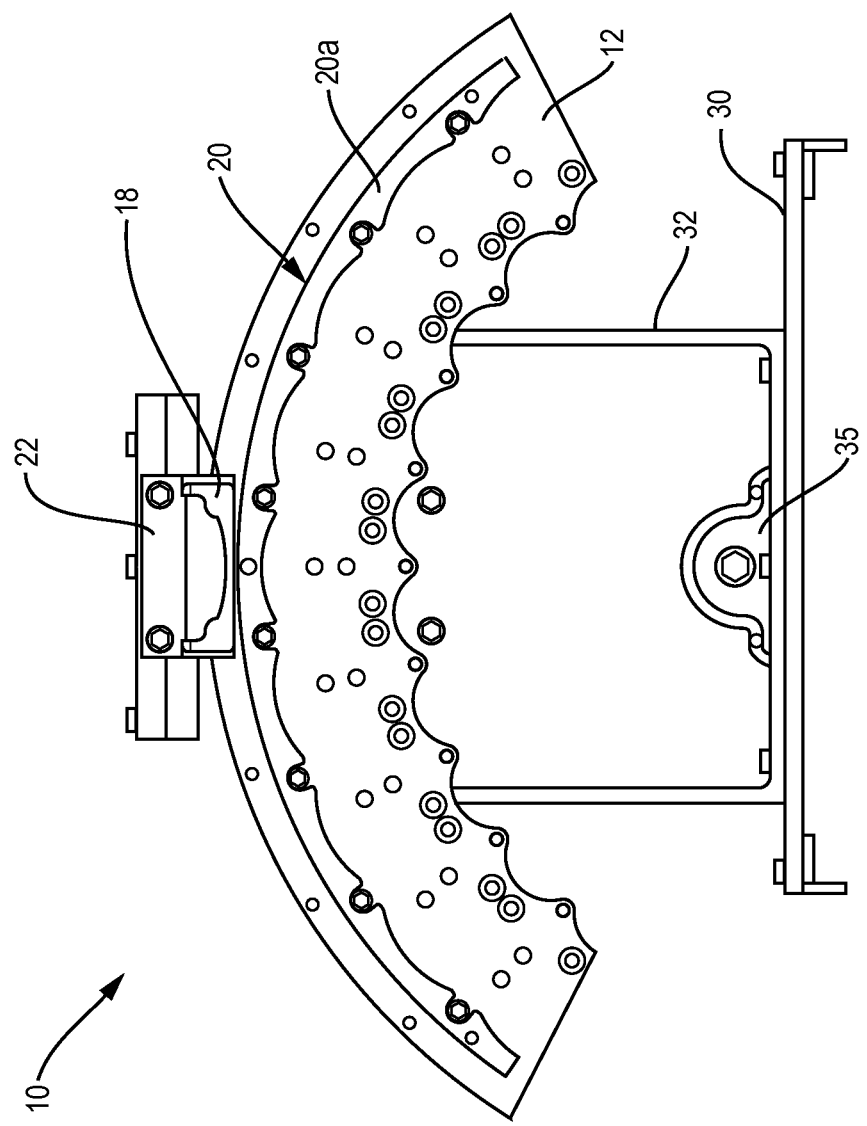
FIG. 1 is a front perspective view of a partial arc curvilinear direct drive servomotor assembly for a nine magnet motor assembly with a magnetic pitch of 24 degree and a radius of 146.6 mm according to the present invention.
Figure 2:
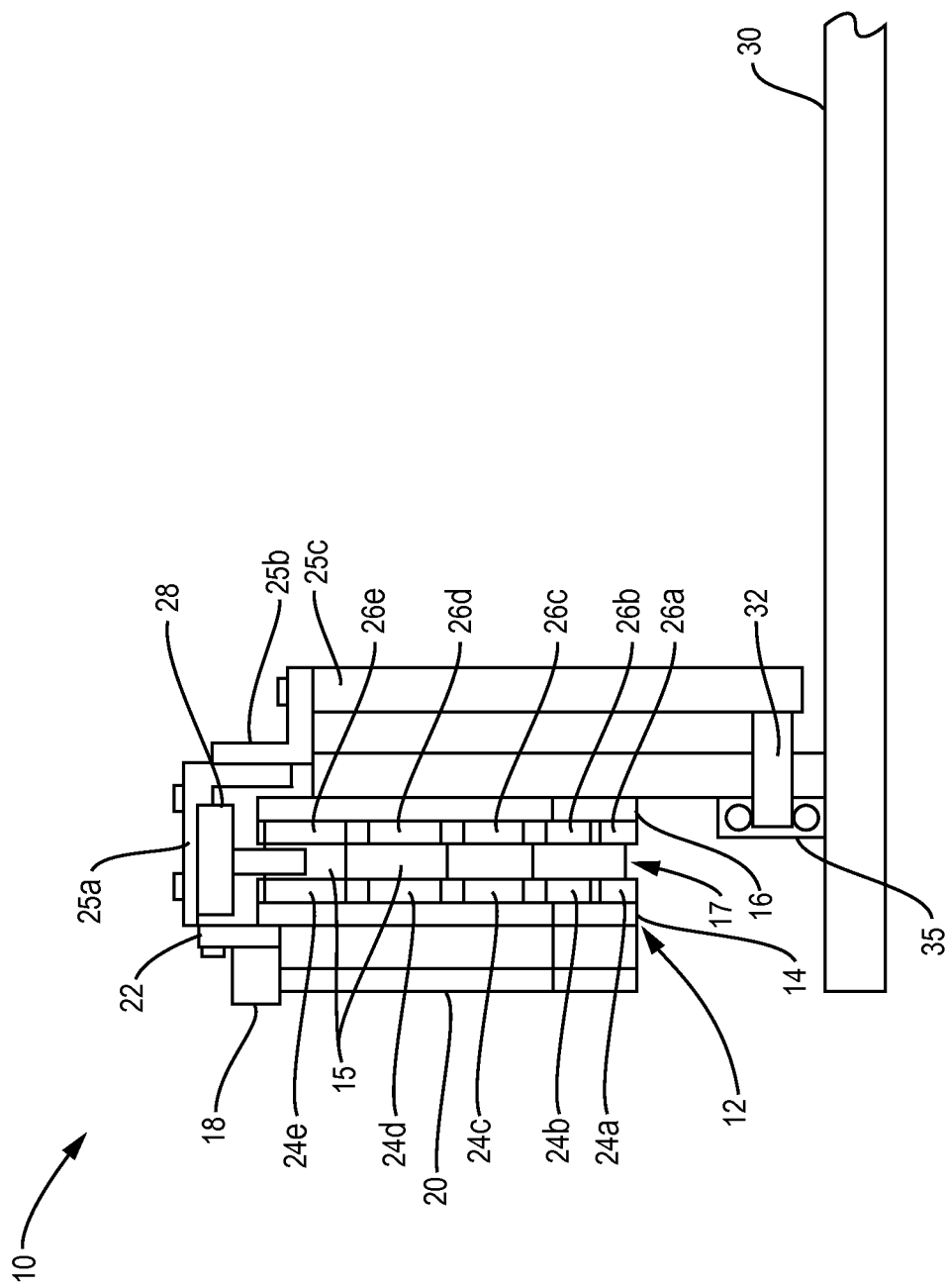
FIG. 2 is a side elevational view of the partial arc curvilinear direct drive servomotor assembly of FIG. 1 showing a curvilinear U-channel with two parallel rare earth permanent magnet plates facing each other, having 9 magnets on each plate.

Referring to FIG. 1 and FIG. 2, FIG. 1 is a front perspective view of a partial arc curvilinear direct drive servomotor (PACDDS) assembly 10 according to the present invention. FIG. 2 is a side elevational view of the servomotor assembly 10 of FIG. 1 showing the outside surface of a curvilinear U-channel magnetic track assembly 12 with two parallel rare earth permanent magnet plates 14, 16 facing each other separated by a steel spacer 15 to form a U-channel track way 17. Attached to a first permanent magnet plate 14 on the inside surface is a plurality of permanent magnets or magnet tiles (24a-24e for the first five magnets, the remaining four magnets 24f-24i are behind and do not show in this side elevational view). The magnets 24a-24i are arranged adjacent to each other in an alternating north-south polar pattern. Attached to a second permanent magnet plate 16 on the inside surface are a plurality of permanent magnets or magnet tiles 26a-26e (26f-26i are behind and do not show in FIG. 2) arranged adjacent to each other in an alternating south-north pole pattern symmetrically across from the north-south pattern of the first permanent magnet plate 14. An ironless three-phase coil armature or forcer 28 is positioned between the first permanent magnet plate 14 and the second permanent magnet plate 16 of the U-channel magnetic track assembly 12 and guided to slide or be positioned along the U-channel of the curvilinear path between plates 14 and 16 of the air track of the track assembly 12 by a set of bearings 35.

Still referring to FIG. 1 and FIG. 2, an encoder assembly 18, 20, 20a is provided on the servomotor assembly 10 comprising an encoder read head 18. The read head 18 and the coil armature winding or forcer 28 are fixed together onto a pivoted payload fixture assembly 22, 25a, 25b, and 25c, which pivots around an axis of the bearing 35. A customized curvilinear encoder scale 20 is curved to be co-axis with that of the curvilinear U-channel rare earth permanent magnet plate 14 of the track 12, and the encoder scale 20 is mounted on a scale base rail 20a, which is mounted on the outside surface of the stationary permanent magnet plate 14. The U-channel magnetic track assembly 12 which includes magnet plates 14 and 16 is mounted on a fixture plate 32. The base plate 30 holds the fixture plate 32 and the servomotor assembly 10.

The partial arc curvilinear direct drive servomotor (PACDDS) assembly 10 has significantly less magnetic flux leakage as a result of the magnets 24a-24i on the first magnetic plate 14 and the magnets 26a-26i on the second magnetic plate 16 facing each other and being arranged to form the curvilinear U-channel track assembly 12. The U-channel magnetic track assembly 12 provides a much stronger and more uniform magnetic field in its magnetic way 17 (or air track 17) for driving the forcer 28 that is fixed with its payload such as a massive large format imaging sensor head. The loading capacity is typically ranging from a few pounds to a few hundred pounds. In general, the magnetic field is mainly confined inside the U-channel. Accordingly, it introduces less magnetic field leakage and electromagnetic interference.

Figure 3:
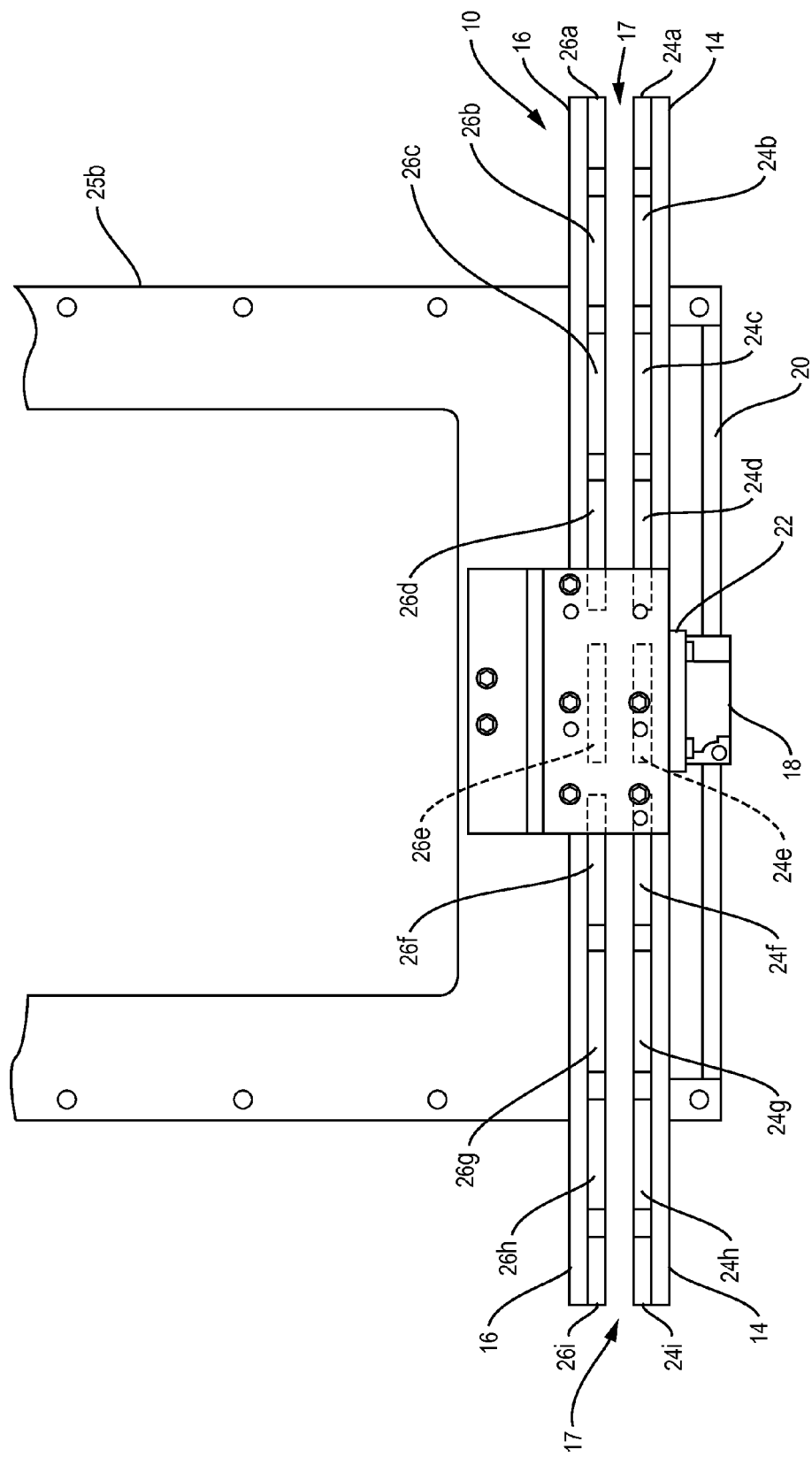
FIG. 3 is a plan view of a partial arc curvilinear direct drive servomotor assembly with 9 magnets on each U-channel parallel magnetic plates facing each other, and showing a forcer which moves above and between the magnetic plates.

Referring to FIG. 3, a plan view of the partial arc curvilinear direct drive servomotor assembly 10 (9 magnet version) shows the two parallel magnetic plates 14, 16 of track assembly 12, the U-channel track way 17, the magnets 24a to 24i and 26a-26i, the encoder read head 18, the encoder scale 20 and a payload frame or mounting bracket 25b, where a payload will be mounted.

Figure 4:
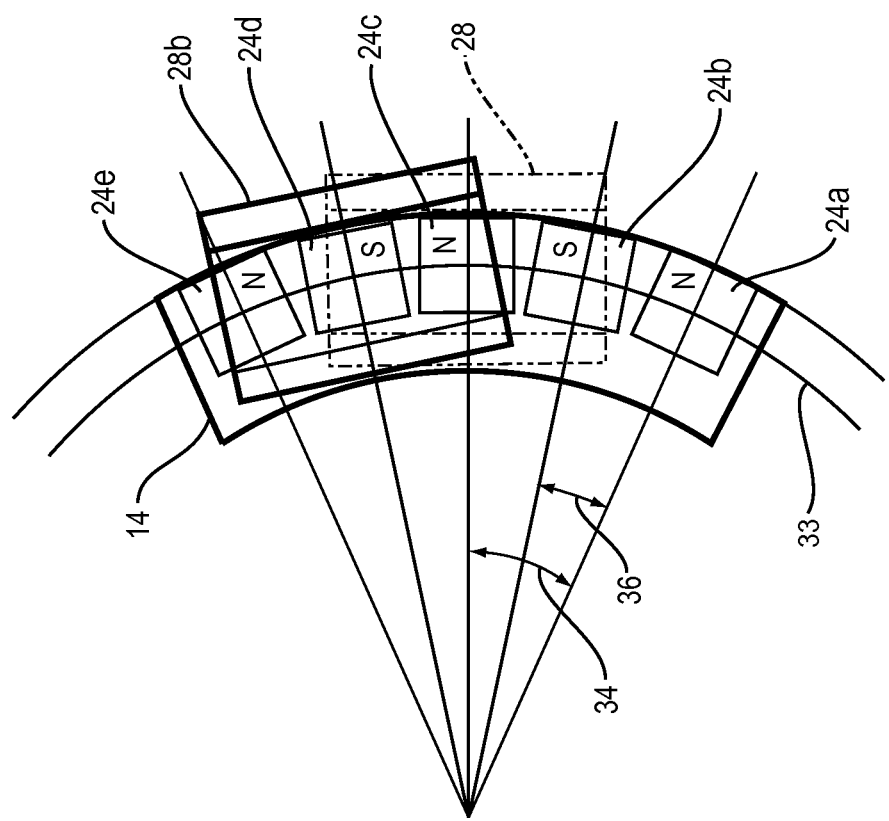
FIG. 4 is a schematic diagram of a portion of a partial arc curvilinear direct drive servomotor showing five permanent magnets with alternating poles and a coil armature winding forcer that slides between two angular positions.

Referring to FIG. 4, a schematic diagram is shown of a portion of the partial arc curvilinear direct drive servomotor assembly 10 with five permanent magnets 24a-24e shown. FIG. 4 shows that these magnets have alternating poles and two angular positions of the coil armature winding (or forcer) 28, wherein a first steel base plate forms the first magnetic plate 14 and a second steel base plate forms the second magnetic plate 16 (not shown). As shown in FIG. 2, the two magnetic plates 14, 16 face each other spaced apart by steel spacers 15 to form the curvilinear U-channel magnetic track way 17 that houses the forcer 28 (or armature) between the plates 14, 16.

The steel spacers 15 are made of soft steel having a low carbon content so that it does not retain a permanent magnetic field. Five rare earth permanent magnets 24a-24e are shown with alternating adjacent poles (north-south-north-south-north) fan shape mounted along a magnet centering radius 33 (146.6 mm in this embodiment), which is derived by a 24 degree magnetic pitch and the dimension of 1 inch square magnets, on the steel plate 14 to form one side of the curvilinear U-channel magnetic track assembly 12. The permanent magnets 24a-24e have a magnetic pitch 34 of a specific fixed angle of twenty-four degrees (24°) in FIG. 4, which is among one of an angle pitch series of 24, 18, 12 and 6 degrees between a center of a north pole magnet to a next north pole magnet for the alternating north and south magnet arrangement. This results in an angle 36 of twelve (12) degrees between the center of a north pole magnet 24a and a south pole magnet 24b in FIG. 4. In another embodiment the arced U-channel magnetic track may have a magnet centering radius 33 of approximately 194.84 mm along which the magnet tiles are mounted with an eighteen degree magnetic pitch 34. The other side of the curvilinear U-channel magnetic track assembly 12 comprises (not shown) the magnetic plate 16 with poles of the facing magnets 26a-26e alternated as south-north-south-north-south. The magnets 24a-24e and 26a-26e (FIGS. 2 and 4) are attached to their respective magnetic plates 14, 16 by high strength epoxy. The ironless armature winding or sliding forcer 28 is moveable in FIG. 4 to position 28b with respect to the permanent magnets within the U-channel track way 17, and the sliding forcer 28 is shown in two positions within the U-channel track way 17.

The square magnets in FIG. 4 have an edge dimension of approximately 1 inch. The present invention has the same sized 1 inch COTS square magnets and the same standardized forcer to make different sized PACDDS assemblies 10 with different radius (from 6 to 14 inch) and different track length (an arc length across 5 to 18 magnets). The flexibility to design a series of different sized PACDDS assemblies 10 is a very important feature of this invention.

Figure 5:
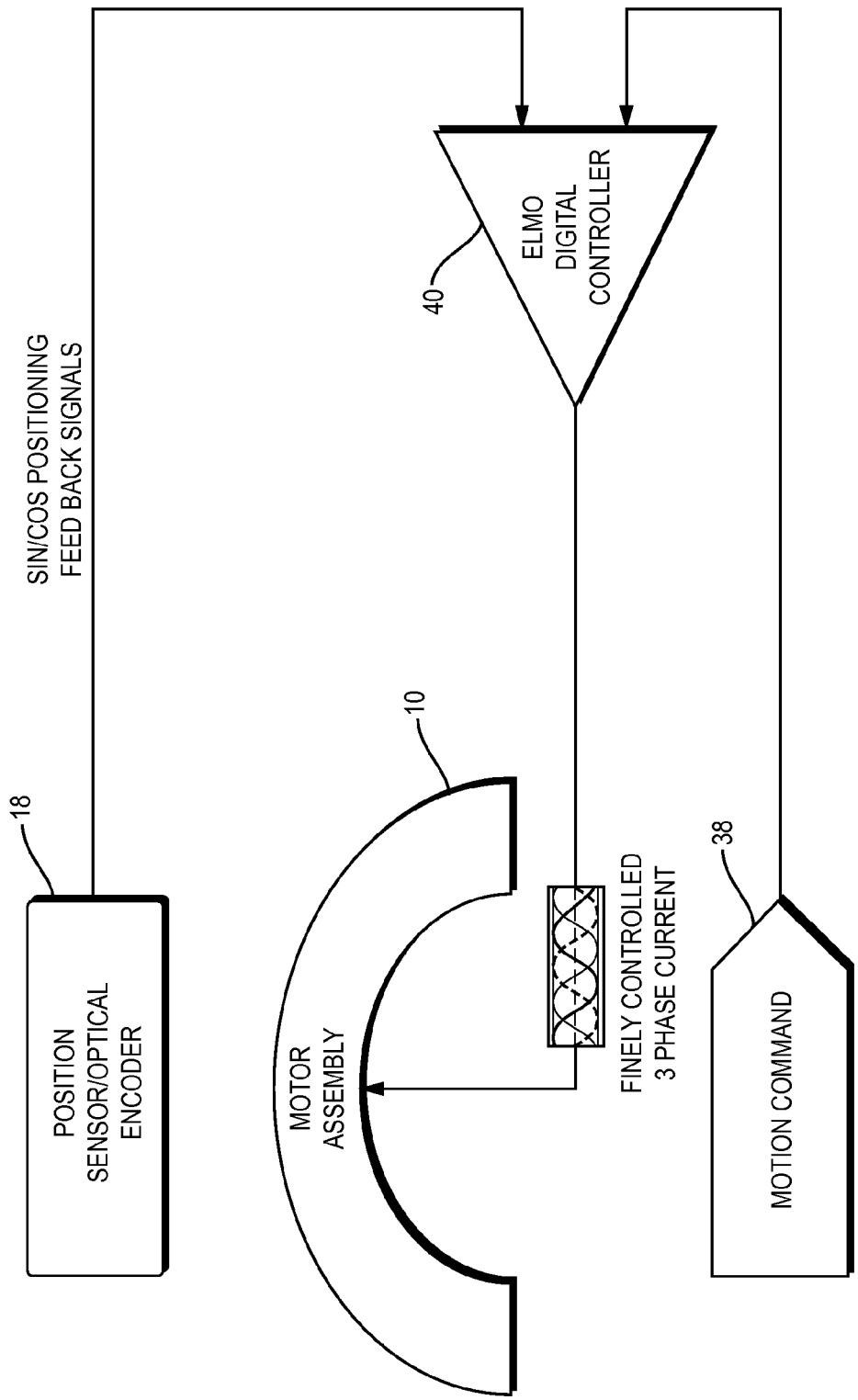
FIG. 5 is a block diagram of the servo operation of PACDDS using a Renishaw optical encoder and an Elmo digital motor controller.

Referring to FIG. 5 a block diagram shows the servo operation of PACDDS using an Elmo digital motor driver or controller 40, which receives a motion command 38 from a computer (not shown) and generates high bandwidth 3-phase power current to drive the PACDSS forcer 28. The desired or reference positioning of forcer 27 is monitored and fed back by a COTS Renishaw optical encoder assembly 18, 20, 20a; the embedded processor of Elmo digital drive calculates solutions according to the positioning feedback for the proper corrective action in fine-tuned 3-phase current to drive the forcer 28 in a closed-loop mode that results in positioning accuracy and system stability.

Figure 6:
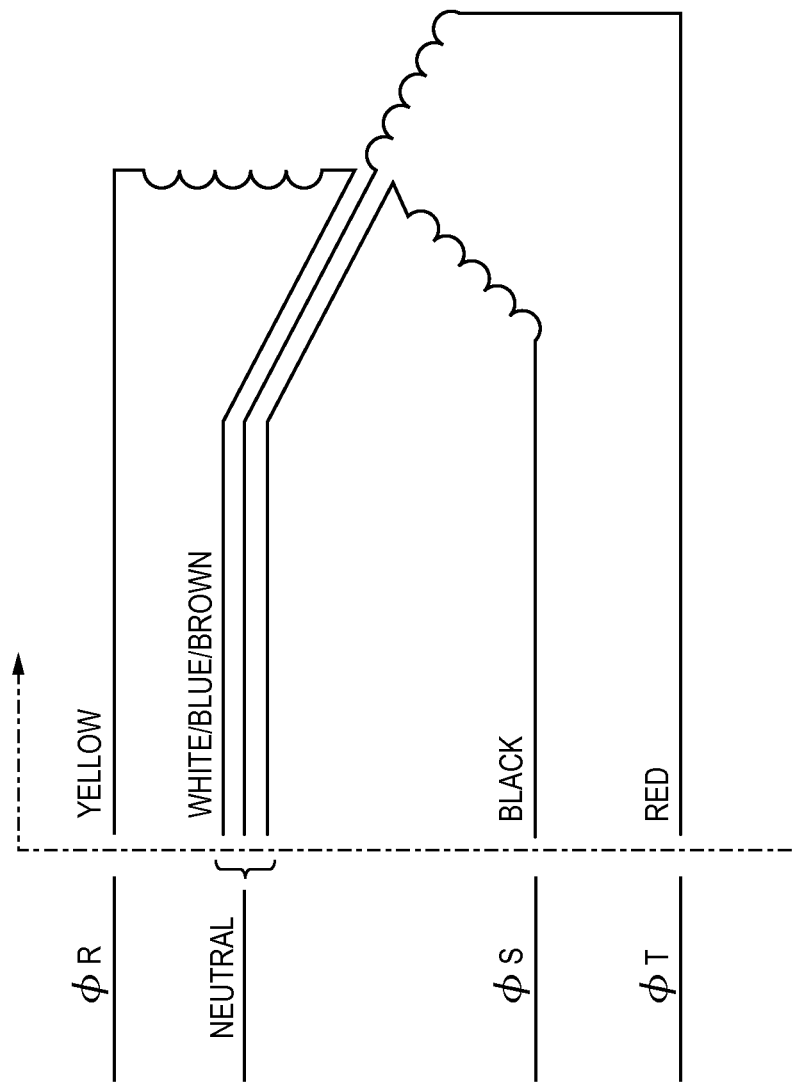
FIG. 6 shows a circuit of a three-phase ironless core coil assembly of the forcer of the PACDDS having three coils internally Y-connected.

The sliding forcer 28 of the PACDDS assembly 10, which may be embodied by a commercial off-the-shelf (COTS) device (Model LMCF02C-HCO, made by Baldor Electric Company, Fort Smith, Ark. 72901), comprises three-phase ironless core coils that are Y-connected (see FIG. 6). The core coil winding is encapsulated in thermally conductive epoxy. The ironless core eliminates the magnetic-attractive force between the coil assembly armature or forcer 28 and the magnet track assembly 12 for smooth operation without magnetic force variation or "cogging". The forcer 28 is used in closed loop servo systems and provides optimum performance for responsive positioning and velocity control and smooth movement. The coil based forcer 28 provides the highest levels of positioning accuracy, repeatability and resolution. The forcer 28 is mounted onto an aluminum mounting bracket 25b (FIG. 2) with other payload fixtures to drive the gimbaled payload.

The PACDDS assembly 10 is designed to achieve low SWaP and high performance by its neat and compact motor structure, direct drive mechanism, and servo implementation.

PACDDS is simply constructed as a curvilinear U-channel device with two parallel rare earth permanent magnet plates 14, 16 facing each other and a light forcer 28, which is an ironless three phase coil assembly in a molded housing and guided by an appropriate bearings assembly in and along the U-channel of the track assembly 12.

The bearing set is needed to guide the forcer and support the payload for pivoted motion. The bearings are generally chosen for particular application needs such as angle range, payload, accuracy, and operational environmental requirements. Essentially, any ball bearing that can provide enough radial and thrust load can be used for PACDDS. One of ordinary skill in the art is able to readily select a bearing set (e.g. from a McMaster catalog) that will work in the PACDDS assembly 10.

The forcer 28 is driven by a direct electromagnetic force which results from the interaction of the magnetic field confined by the U-channel of the stationary curvilinear rare earth magnet track assembly 12 with the current inside the coils of the forcer 28. The current inside the forcer 28 is generated and controlled by a programmable power electronics device. By providing programmed electric current, the angular position and motion of the gimbal payload, which is fixed to the forcer 28, are controlled.

The PACDDS assembly 10 is highly efficient because it is driven by the direct electromagnetic force without the need of contact with mechanical parts to transmit the driving force. It eliminates gearboxes, drive shaft, and/or any mechanical transmission linkage completely. Using the U-channel structure, the PACDDS assembly 10 has minimal magnetic flux leakage.

Driven by a set of today's miniaturized power electronics device closely looped with a positioning feedback precision optical encoder, the position and velocity of the gimbaled payload is programmable and precisely controlled. Integrated with a GPS/IMU, the sensor payload can be dynamically and precisely controlled for advanced airborne remote sensing missions, including the camera stabilization and programmable pointing.

Another advantage of PACDDS assembly 10 of this invention is that its curvilinear U-channel magnetic way track assembly 12 can be customized with special arc length and variable radius while using the same COTS forcer 28. With this advantage, different sized PACDDSs have been designed for sophisticated three-axis airborne gimbals, achieving high performance in three dimensional angular position accuracy, fast responsiveness, and wide angle range of partial arc pivoting.

This invention has been disclosed in terms of a preferred embodiment. It will be apparent that many modifications can be made to the disclosed method and apparatus without departing from the invention. Therefore, it is the intent of the appended claims to cover all such variations and modifications as come within the true spirit and scope of this invention.

What is claimed is:

1. In combination: a partial arc curvilinear direct drive servomotor (PACDDS) assembly; a digital controller coupled to said PACDDS assembly to provide a drive signal to said PACDDS assembly in response to a motion command and a positioning feedback signal; and a position sensor optical encoder attached to said PACDDS assembly for monitoring reference position of a coil armature or forcer of said PACDDS assembly to the fixed encoder scale and providing said positioning feedback signal to said digital controller to enable closed-loop servomotor operation of said PACDDS assembly, wherein said PACDDS assembly comprises; a pair of parallel plates having a partial arc separated by a spacer; a first plurality of permanent magnets attached to a first of said parallel plates on an inside surface, the permanent magnets being arranged adjacent to each other in an alternating north-south pole pattern forming a first magnetic plate; a second plurality of permanent magnets attached to a second of said parallel plates on an inside surface, the permanent magnets being arranged adjacent to each other in an alternating south-north pole pattern symmetrically across from the north-south pole pattern of said first of said parallel plates forming a second magnetic plate; a moveable armature winding positioned between said first and second magnetic plates; and an encoder system having a read head mounted to said armature winding and above a curvilinear encoder scale mounted on top of said first magnetic track.

2. The combination as recited in claim 1 wherein said partial arc of said parallel plates is formed along a predetermined radius approximately 146.6 mm using one inch square magnets with a twenty-four degree (24°) magnet pitch.

3. The combination as recited in claim 1 wherein said partial arc of said parallel plates is formed along a predetermined radius approximately 194.84 mm using one inch square magnets with an eighteen degree (18°) magnet pitch.

* * * * *